Patented Sept. 15, 1925.

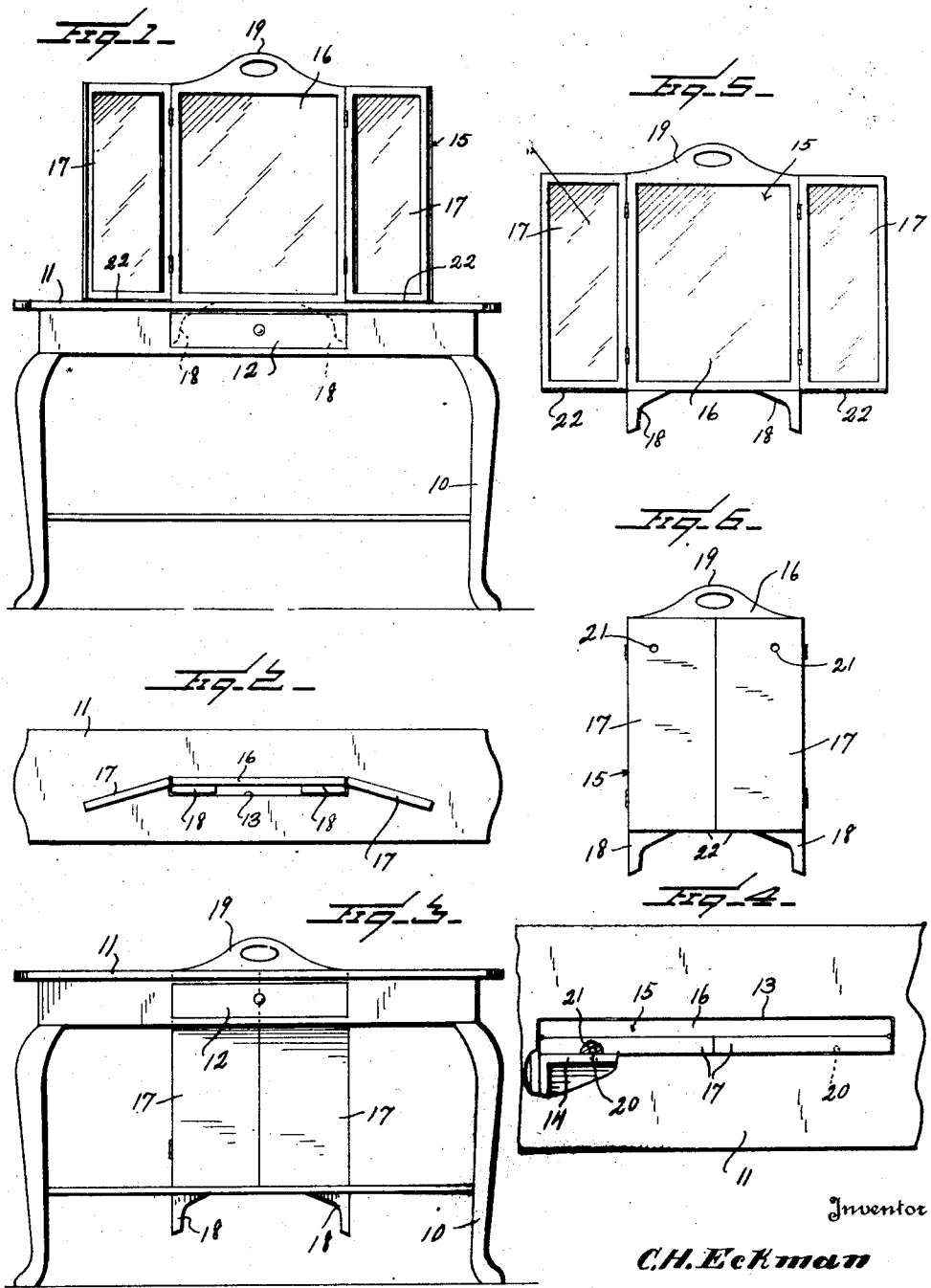

1,553,759

UNITED STATES PATENT OFFICE.

CHARLES H. ECKMAN, OF HUNTINGTON, WEST VIRGINIA.

MIRROR ATTACHMENT FOR TABLES.

Application filed September 17, 1924. Serial No. 738,243.

*To all whom it may concern:*

Be it known that I, CHARLES H. ECKMAN, a citizen of the United States, residing at Huntington, in the county of Wayne and State of West Virginia, have invented certain new and useful Improvements in Mirror Attachments for Tables, of which the following is a specification, reference being had to the accompanying drawings.

This invention relates to mirror attachments for tables, and more particularly to an attachment of this character for light tables, such as end tables and the like.

An important object of the invention is to provide a device of this character which is so constructed that the mirror when not desired may be entirely concealed from view and may be locked in its concealed position.

A further object of the invention is to provide a mirror for this purpose having a hand-hold projecting above the surface of the table when the mirror is concealed, so that it may be grasped and employed as a handle to shift the table from place to place.

A still further object of the invention is to provide a mirror of the folding type having a wing or wings which in the elevated or exposed position of the mirror serve to support the mirror upon the surface of the table.

These and other objects I attain by the construction shown in the accompanying drawings, wherein for the purpose of illustration is shown a preferred embodiment of my invention and wherein:—

Figure 1 is a front elevation of a table having a mirror attachment constructed in accordance with my invention;

Figure 2 is a plan view thereof;

Figure 3 is a front elevation with the mirror attachment in the closed or inoperative position;

Figure 4 is an enlarged fragmentary plan view of the table with the mirror in the inoperative position, a portion of the table top being broken away to show the locking means for maintaining the mirror in an inoperative position;

Figure 5 is a front elevation of the mirror attached and in the open position;

Figure 6 is a similar view thereof in the closed or folded position.

Referring now more particularly to the drawings, the numeral 10 indicates a small table of any suitable character but preferably of the type commonly known as an end table. As is well known, these tables have relatively narrow tops 11 and are provided with one small centrally located drawer 12. In accordance with my invention, I form in the top 11 a rectangular opening 13, the front face of the opening being in a vertical plane approximately aligning with the rear edge 14 of the drawer 12 when in the closed position.

A mirror 15 is provided consisting of a central broad panel 16, to the side edges of which are hinged short panels 17 which when folded upon the front face of the broad panel cover the mirror thereof and meet approximately at the center of the central panel, as more clearly shown in Figure 6. The lower surface of the central panel has at its sides two downwardly projecting legs 18, the edges of which are in the same plane as the side edges of the central mirror panel. The upper edge of the mirror panel is provided with a handle 19 of any preferred ornamental design.

The width of the central panel is equal to the length of the opening 13, while the combined thicknesses of the central panel and side panels when folded upon the central panel is equal to the width of such opening. It will be obvious that the panels when folded may be slid downwardly through the opening, so that the table is provided with a flat top above which projects only the handle 19. In order to support the mirrors in this concealed position until desired, for example, when transporting the table from place to place, the rear face of the drawer has projecting rearwardly therefrom a pair of spaced dowels 20 entering sockets 21, one of which is formed in the back of each of the panels 17. When it is desired to elevate the mirror, the drawer is partially opened to disengage the dowels and the mirror is drawn upwardly by the hand until the lower ends of the panel 17 clear the upper surface of the table, when the panels 17 are swung outwardly to the position shown in Figure 1 so that the mirrors thereof are exposed as is likewise the mirror of the central panel 16. At this time the legs 18 are projecting into the opening 13, and these legs are of a thickness equal to the width of the opening 13 so that they fit therein and prevent wobbling or vibration of the mirror 16. In order to prevent scratching of the upper surface of the table by contact therewith of the under surface of the panel 17 during such swinging movement, the under surfaces of these panels have preferably glued or otherwise applied thereto a felt or similar soft surfacing strip 22.

It will be obvious that the manner of supporting and locking the mirror in position is capable of a considerable range of change and modification without materially departing from the spirit of my invention, and I accordingly do not limit myself to such specific structure as hereinbefore set forth except as hereinafter claimed.

I claim:—

1. In combination with a table having a vertical opening formed in the top thereof, a mirror panel vertically slidable through said opening, and a pair of lesser panels pivoted to the first named panel and in elevated position of the first named panel swingable to overlie the upper surface of the table and engage with the upper surface of the table to support the first named panel in such elevated position.

2. In combination with a table having an opening formed therein, a mirror panel vertically slidable through said opening, a pair of lesser panels pivoted to the first named panel and in elevated position of the first named panel swingable to overlie the upper surface of the table and engage with the upper surface of the table to support the first named panel in such elevated position, and means for locking said panels in lowered position with the upper surface thereof substantially flush with the top of the table.

3. In combination with a table having an opening therein, a mirror assembly comprising a main panel and lesser panels pivoted to the vertical edges of the main panel and foldable upon the main panel to conceal the mirror thereof, said assembly when in folded position fitting the opening for vertical sliding movement therein so that the assembly may be raised and lowered, the lesser panels of said assembly when in raised position being swingable to overlie the upper surface of the table and engage with the upper surface of the table to support the assembly in such elevated position, said main panel having portions extending into the opening to prevent displacement of the assembly.

4. In combination with a table having an opening therein, a mirror assembly comprising a main panel and lesser panels pivoted to the vertical edges of the main panel and foldable upon the main panel to conceal the mirror thereof, said assembly when in folded position fitting the opening for vertical sliding movement therein so that the assembly may be raised and lowered, the lesser panels of said assembly when in raised position being swingable to overlie the upper surface of the table and engage with the upper surface of the table to support the assembly in such elevated position, said main panel having portions extending into the opening to prevent displacement of the assembly, a drawer for said table, and coacting means carried by the drawer and assembly for locking the assembly in lowered position when the drawer is closed.

5. In combination with a table having an opening therein, a mirror assembly comprising a main panel and lesser panels pivoted to the vertical edges of the main panel and foldable upon the main panel to conceal the mirror thereof, said assembly when in folded position fitting the opening for vertical sliding movement therein so that the assembly may be raised and lowered, the lesser panels of said assembly when in raised position being swingable to overlie the upper surface of the table and engage with the upper surface of the table to support the assembly in such elevated position, said main panel having portions extending into the opening to prevent displacement of the assembly, a drawer for said table, and coacting means carried by the drawer and assembly for locking the assembly in lowered position when the drawer is closed, said assembly affording at its upper end a hand-hold projecting above the upper surface of the table when the assembly is in the lowered position.

In testimony whereof I hereunto affix my signature.

CHARLES H. ECKMAN.